United States Patent
Klug

(10) Patent No.: US 11,833,988 B2
(45) Date of Patent: Dec. 5, 2023

(54) LUBRICANT CONSUMER SYSTEM FOR A MOTOR VEHICLE

(71) Applicant: Magna Powertrain GmbH & Co KG, Lannach (AT)

(72) Inventor: Joachim Klug, Stainz (AT)

(73) Assignee: MAGNA POWERTRAIN GMBH & CO KG, Lannach (AT)

( * ) Notice: Subject to any disclaimer, the term of this patent is extended or adjusted under 35 U.S.C. 154(b) by 0 days.

(21) Appl. No.: 17/617,403

(22) PCT Filed: Jun. 17, 2020

(86) PCT No.: PCT/EP2020/066820
§ 371 (c)(1),
(2) Date: Dec. 8, 2021

(87) PCT Pub. No.: WO2020/254440
PCT Pub. Date: Dec. 24, 2020

(65) Prior Publication Data
US 2022/0242345 A1 Aug. 4, 2022

(30) Foreign Application Priority Data
Jun. 18, 2019 (DE) .......................... 102019208860.0

(51) Int. Cl.
*F01M 11/00* (2006.01)
*F01M 11/06* (2006.01)
(Continued)

(52) U.S. Cl.
CPC .......... *B60R 17/02* (2013.01); *F01M 11/0004* (2013.01); *F01M 11/065* (2013.01);
(Continued)

(58) Field of Classification Search
CPC ............... F01M 11/064; F01M 11/065; F01M 2011/0041; F01M 2011/0095;
(Continued)

(56) References Cited

U.S. PATENT DOCUMENTS 2,275,576 A * 3/1942 Ware ...................... F01M 5/007
123/196 AB
2,440,815 A * 5/1948 Wharam .............. F01M 11/065
184/106

(Continued)

FOREIGN PATENT DOCUMENTS

DE 2815633 A1 10/1978
GB 1284145 A 8/1972
(Continued)

OTHER PUBLICATIONS

Written Opinion of International Searching Authority and International Search Report for International Application No. PCT/EP2020/066820, dated Sep. 11, 2020, 10 page(s), English Translation of International Search Report Included.

*Primary Examiner* — Minh Truong
(74) *Attorney, Agent, or Firm* — Dickinson Wright PLLC

(57) ABSTRACT

Lubricant consumer system comprising at least one lubricant consumer, at least one rotating component, wherein fluid lubricant can be conveyed via the rotating component, and a lubricant distributor system, wherein the lubricant distributor system has at least two lubricant tanks, namely a first lubricant tank and at least one second lubricant tank, and a lubricant channel, wherein the two lubricant tanks are fluidically connected to one another and to the lubricant consumer via the lubricant channel, wherein one of the two lubricant tanks is designed and arranged in such a way that, in a horizontal position of the lubricant consumer system, it receives the fluid lubricant of the rotating component and supplies both the other lubricant tank and the lubricant consumer with lubricant via the lubricant channel, and wherein the other lubricant tank is designed and arranged in such a way that, in an inclined position of the lubricant consumer unit, the lubricant consumer is supplied with lubricant from at least the other lubricant tank.

7 Claims, 3 Drawing Sheets

(51) Int. Cl.
*F16H 57/04* (2010.01)
*B60R 17/02* (2006.01)
*F16H 57/05* (2006.01)

(52) U.S. Cl.
CPC ....... *F16H 57/045* (2013.01); *F16H 57/0443* (2013.01); *F01M 2011/0041* (2013.01); *F01M 2011/0095* (2013.01); *F16H 57/0473* (2013.01); *F16H 57/05* (2013.01)

(58) Field of Classification Search
CPC ........... F01M 2011/068; F16H 57/0435; F16H 57/0442; F16H 57/0443; F16H 57/045
See application file for complete search history.

(56) References Cited

U.S. PATENT DOCUMENTS

| | | | |
|---|---|---|---|
| 4,107,984 A | 8/1978 | Unger et al. | |
| 4,750,456 A * | 6/1988 | Ladrach | F01M 11/12 123/196 S |
| 5,078,233 A * | 1/1992 | Oetting | F01M 1/12 123/196 R |
| 5,997,372 A | 12/1999 | Idzikowski et al. | |
| 7,270,105 B2 * | 9/2007 | Furuya | F01M 1/04 123/196 R |
| 8,820,479 B2 * | 9/2014 | Saenz De Ugarte Sevilla | F03D 80/70 184/6.12 |
| 9,581,237 B2 * | 2/2017 | Stevens | F16N 19/006 |
| 2003/0006096 A1 * | 1/2003 | Rimkus | F16H 57/0447 184/6.12 |
| 2013/0133454 A1 * | 5/2013 | Barthel | F03D 80/70 74/468 |
| 2015/0053505 A1 * | 2/2015 | Klowak | F01M 11/061 184/105.1 |
| 2016/0363208 A1 * | 12/2016 | Louis | F16H 57/046 |
| 2018/0031111 A1 * | 2/2018 | Mehravaran | F28F 27/02 |
| 2019/0360601 A1 * | 11/2019 | Leroyer | F16K 11/074 |

FOREIGN PATENT DOCUMENTS

| | | |
|---|---|---|
| JP | S58200016 A | 11/1983 |
| JP | S6375306 A | 4/1988 |
| WO | 2017093117 A1 | 6/2017 |

* cited by examiner

LUBRICANT CONSUMER SYSTEM FOR A MOTOR VEHICLE

CROSS-REFERENCE TO RELATED APPLICATIONS

This application is a National Stage of International Application No. PCT/EP2020/066820, filed Jun. 17, 2020, which claims priority to DE102019208860.0, filed Jun. 18, 2019. The entire disclosures of each of the above applications are incorporated herein by reference.

FIELD OF THE INVENTION

The present invention relates to a lubricant consumer system for a motor vehicle comprising at least one lubricant consumer, at least one rotating component, wherein fluid lubricant can be conveyed via the rotating component, and a lubricant distributor system, wherein the lubricant distributor system has at least two lubricant tanks, namely a first lubricant tank and at least one second lubricant tank, and a lubricant channel, wherein the two lubricant tanks are fluidically connected to one another and to the lubricant consumer via the lubricant channel.

BACKGROUND OF THE INVENTION

This section provides information related to the present disclosure which is not necessarily prior art.

Lubricant consumer systems, such as for example clutch systems, are generally installed in a motor vehicle. These systems use a lubricant in order to ensure a cooling and a lubrication of a lubricant consumer, such as for example a multi-disk clutch.

However, problems often occur in the supply to a lubricant consumer, in particular in the case of a significant incline relative to the direction of gravity of a motor vehicle. Due to the constant incline of the lubricant consumer system in the one or in the other direction, a sufficient cooling and lubrication of a lubricant consumer is not continuously ensured.

SUMMARY OF THE INVENTION

This section provides a general summary of the disclosure, and is not a comprehensive disclosure of its full scope or all of its features.

It is an object of the invention to improve a lubricant consumer system for a motor vehicle relative to the reliability of the supply of lubricant to lubricant consumers, even in extreme situations, in particular in the case of a significant incline relative to the direction of gravity of a motor vehicle.

The object is achieved by a lubricant consumer system for a motor vehicle comprising at least one lubricant consumer, at least one rotating component, wherein fluid lubricant can be conveyed via the rotating component, and a lubricant distributor system, wherein the lubricant distributor system has at least two lubricant tanks, namely a first lubricant tank and at least one second lubricant tank, and a lubricant channel, wherein the two lubricant tanks are fluidically connected to one another and to the lubricant consumer via the lubricant channel, wherein one of the two lubricant tanks is designed and arranged in such a way that, in a horizontal position of the lubricant consumer system, it receives the fluid lubricant of the rotating component and supplies both the other lubricant tank and the lubricant consumer with fluid lubricant via the lubricant channel, and wherein the other lubricant tank is designed and arranged in such a way that, in an inclined position of the lubricant consumer unit, the lubricant consumer is supplied with lubricant from at least the other lubricant tank.

The lubricant consumer system according to the invention comprises at least one lubricant consumer, at least one rotating component as well as a lubricant distributor system.

In this context a lubricant is to be understood to mean a fluid, namely flowable, lubricant, in particular oil.

A lubricant consumer may be, for example, a multi-disk clutch, a lubrication point, such as for example a bearing to be lubricated, etc.

The rotating component is preferably configured by a chain. In this case, however, it may also be a gearwheel or the like. The rotating component is designed in any case such that it is able to convey lubricant by rotation, for example from a lubricant sump.

According to the invention, the lubricant distributor system has two lubricant tanks, namely a first lubricant tank and at least one second lubricant tank, as well as a lubricant channel. Generally the lubricant distributor system serves for the distribution of lubricant from the first or, respectively, the second lubricant tank. According to the present invention the first lubricant tank and the second lubricant tank are connected to one another and additionally to the lubricant consumer via the lubricant channel.

According to the invention, one of the two lubricant tanks, namely the first lubricant tank or the second lubricant tank is designed and arranged in such a way that, in a horizontal position of the lubricant consumer system, it receives or, respectively, collects lubricant conveyed and thrown off via the rotating component, and supplies both the respective other lubricant tank and the lubricant consumer with fluid lubricant via the lubricant channel.

In this context, a horizontal position is to be understood to mean a position of the lubricant consumer system perpendicular to the direction of gravity of the lubricant consumer system (or, respectively, of a motor vehicle).

According to the invention, the respective other lubricant tank is designed and arranged in such a way that, in an inclined position of the lubricant consumer unit, the lubricant consumer is supplied with lubricant from at least the other lubricant tank. The lubricant tank which is not supplied with lubricant by the rotating component, i.e. the "other" lubricant tank, thus substantially serves as a lubricant reservoir.

In this context an inclined position is to be understood to mean a position of the lubricant consumer system at any angle, in particular at an angle of >45°, relative to the direction of gravity of the lubricant consumer system (or, respectively, of a motor vehicle).

Due to the design according to the invention of the lubricant consumer system, in particular due to the design of the lubricant distributor system, a sufficient supply of lubricant to the lubricant consumer is still ensured even in the case of significant inclines of the lubricant consumer system relative to the direction of gravity.

Developments of the invention are specified in the dependent claims, the description and the accompanying drawings.

In a preferred variant of the present invention, the first lubricant tank has a first outflow, the first lubricant tank being fluidically connected thereby to the lubricant channel, and the second lubricant tank has an inflow and a second outflow, the second lubricant tank being fluidically connected thereby to the lubricant channel.

The inflow and the second outflow of the second lubricant tank may be configured by a web in the lubricant channel, wherein the web extends substantially in a radial direction. The web in this case may be configured directly via a wall of the lubricant channel, i.e. in one piece with the lubricant channel, or inserted as a separate component in the lubricant channel and fixedly connected thereto, for example by welding, adhesive bonding, etc.

In this case, the term "radial" describes a direction opposing a direction of gravity.

Preferably the lubricant distributor system has a least one pump for conveying lubricant from the first tank into the second tank and to the lubricant consumer in the horizontal position of the lubricant consumer system.

The second lubricant tank is preferably configured to be substantially closed and has at least one ventilation opening.

Further areas of applicability will become apparent from the description provided herein. The description and specific examples in this summary are intended for purposes of illustration only and are not intended to limit the scope of the present disclosure.

DRAWINGS

The drawing described herein are for illustrative purposes only of selected embodiments and not all possible implementations and are not intended to limit the scope of the present disclosure.

Figure 1:
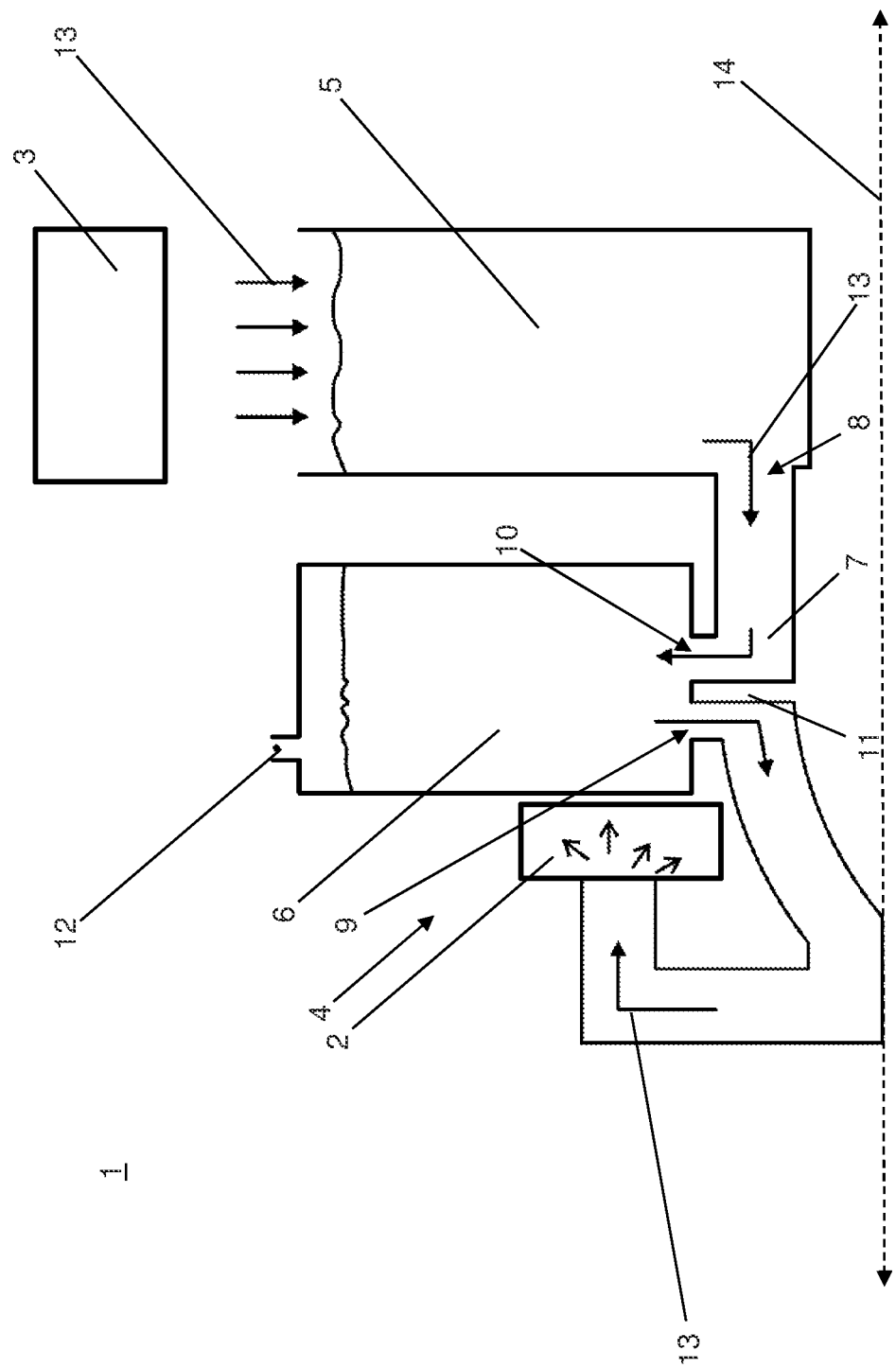
FIG. 1 shows a schematic view of a first variant of a lubricant consumer system, in particular a lubricant distributor system, in a horizontal position (horizontal installed position).
Figure 2:
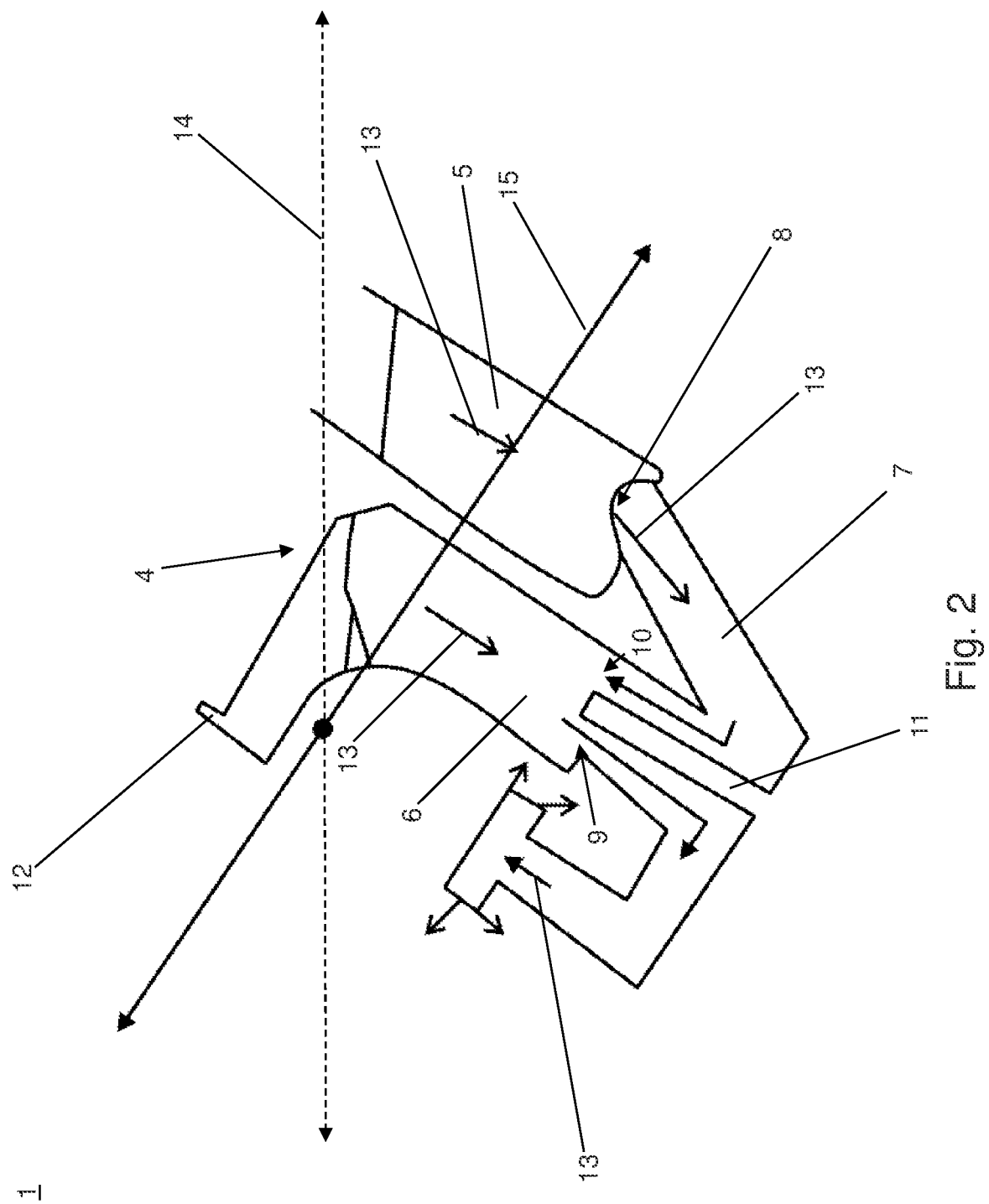
FIG. 2 shows a schematic view of a lubricant consumer system, in particular a lubricant distributor system, in a position which is inclined relative to a horizontal position.
Figure 3:
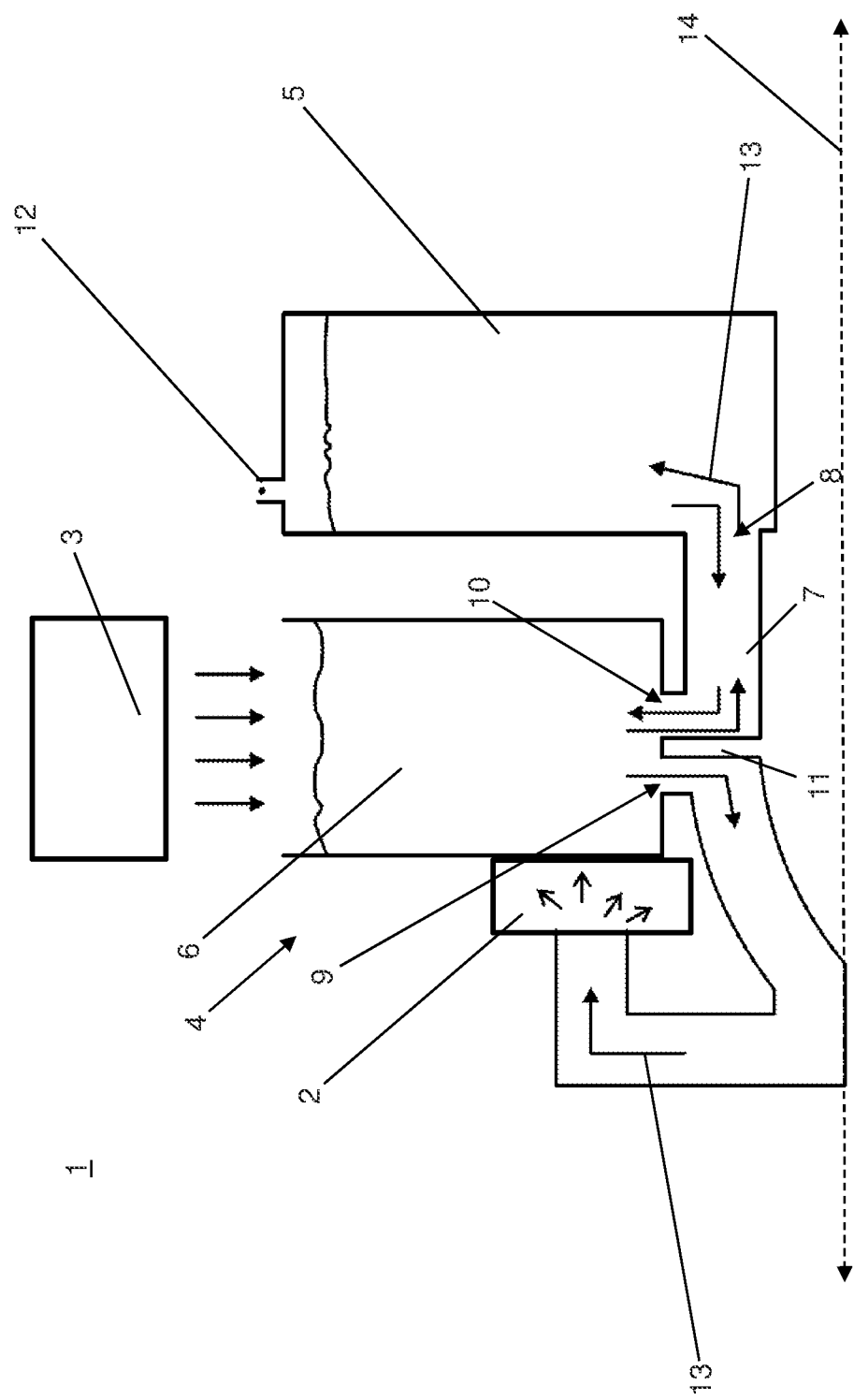
FIG. 3 shows a schematic view of a second variant of a lubricant consumer system, in particular a lubricant distributor system, in a horizontal position (horizontal installed position).

FIG. 1, FIG. 2 and FIG. 3 show in each case a lubricant consumer system 1, in particular a lubricant distributor system 4 of the lubricant consumer system 1.

The lubricant distributor system 1 comprises a lubricant consumer 2, namely a multi-disk clutch, a rotating component 3, namely a chain, and the lubricant distributor system 4.

Multi-disk clutches and multi-disk brakes are sufficiently well known from vehicle technology. They comprise a set of disks, consisting of a plurality of outer disks and a plurality of inner disks which are arranged alternately one behind the other in the axial direction, wherein in the closed state of the multi-disk clutch or, respectively, the multi-disk brake the outer disks are brought into a frictional connection with the inner disks. In the open or, respectively, ventilated state of the set of disks, a predetermined air gap is provided between the outer disks and the inner disks.

The term "axial" describes a direction along a longitudinal axis of the multi-disk clutch, more specifically the set of disks.

In the context of rotating components 3 inside a motor vehicle, traction mechanisms comprising a chain as a traction means, namely as a rotating component 3, are also sufficiently well known. The chain in this case is generally arranged such that it is partially immersed in a lubricant sump and, by rotation, the lubricant is conveyed "upwardly" out of the lubricant sump and thrown off. The thrown off lubricant is collected by means of suitable collecting devices and in the present exemplary embodiment conducted into a first lubricant tank 5 of the lubricant distributor system 4.

The arrows 13 shown in FIG. 1 to FIG. 3 show schematically the direction of flow of the lubricant. In the figures, in order to maintain clarity, only a portion of the arrows is denoted by "13" for representing the direction of flow of the lubricant.

The lubricant distributor system 4 has in addition to the first lubricant tank 5 a second lubricant tank 6 and a lubricant channel 7. The first lubricant tank 5 has a first outflow 8. The second lubricant tank 6 has an inflow 10 and a second outflow 9. The first lubricant tank 5 is fluidically connected to the lubricant channel 7 via the first outflow 8. The second lubricant tank 6 is fluidically connected via the inflow 10 and the second outflow 9 to the lubricant channel 7. The lubricant channel is directly or indirectly connected at one end to the lubricant consumer 2, namely the multi-disk clutch. The inflow 10 and the second outflow 9 are configured via a web 11 in the lubricant channel 7. The web 11 is configured via a radial extension of the wall of the lubricant channel 7. The web 11 and the lubricant channel 7 are thus designed in one piece. The inflow 10 and the second outflow 9 are located above the first outflow 8 relative to the direction of gravity.

In a horizontal position, i.e. in a horizontal installed position of the lubricant consumer system 1 (and thus of the motor vehicle), lubricant is conducted from the rotating component 3 into the first lubricant tank 5. To this end, this first lubricant tank is configured to be at least partially open. The lubricant in the first lubricant tank 5 flows via the first outflow 8 out of this first lubricant tank and via the inflow 10 into the second lubricant tank 6. The second lubricant tank 6 is designed to be substantially closed and has merely one ventilation opening 12. The lubricant flows back via the second outflow 9 of the second lubricant tank 6 into the lubricant channel 7 and via the lubricant channel 7 to the lubricant consumer 2. In the horizontal position a uniform, namely equally high, lubricant level is present between the first lubricant tank 5 and the second lubricant tank 6 (FIG. 1).

The horizontal position is shown schematically in FIG. 1 to FIG. 3 by a dashed double arrow 14.

In an inclined position of the lubricant consumer system 1 (and thus of the motor vehicle), the line of lubricant from the rotating component 3 into the first lubricant tank 5 is substantially interrupted. A supply to the lubricant consumer 2 may be ensured via the lubricant "stored" in the second lubricant tank 6 after the first lubricant tank 5 has run empty (FIG. 2).

The inclined position is shown in FIG. 1 to FIG. 3 schematically by a solid double arrow 15.

In an alternative second variant according to FIG. 3 in the horizontal position, i.e. in a horizontal installed position of the lubricant consumer system 1 (and thus of the motor vehicle), lubricant is conducted from the rotating component 3 into the second lubricant tank 6. To this end, this second lubricant tank is configured to be at least partially open. The lubricant in the second lubricant tank 6 flows via the inflow 10 out of and into said second lubricant tank and via the first outflow 8 into and out of the first lubricant tank 5. The first lubricant tank 5 is configured to be substantially closed and has only one ventilation opening 12. The lubricant also flows via the second outflow 9 of the second lubricant tank 6 into the lubricant channel 7 and via the lubricant channel 7 to the lubricant consumer 2. In the horizontal position a uniform, namely equally high, lubricant level is also present here between the first lubricant tank 5 and the second lubricant tank 6 (FIG. 3).

LIST OF REFERENCE DESIGNATIONS

1 Lubricant consumer system
2 Lubricant consumer
3 Rotating component
4 Lubricant distributor system
5 First lubricant tank
6 Second lubricant tank
7 Lubricant channel
8 First outflow
9 Second outflow
10 Inflow
11 Web
12 Ventilation opening
13 Direction of flow of lubricant
14 Horizontal position
15 Inclined position

What is claimed is:

1. A lubricant consumer system comprising:
at least one lubricant consumer,
at least one rotating component, wherein fluid lubricant can be conveyed via the rotating component, and
a lubricant distributor system, wherein the lubricant distributor system has a first lubricant tank and a second lubricant tank, and a lubricant channel, wherein the lubricant channel includes a first lubricant channel segment fluidly connecting the first lubricant tank and the second lubricant tank and a second lubricant channel segment fluidly connecting the second lubricant tank and the consumer;
wherein the first lubricant tank and the second lubricant tank each extend in a longitudinal direction between a top and a bottom,
wherein one of the first and second lubricant tanks is designed and arranged in such a way that, in a horizontal position of the lubricant consumer system, it receives the fluid lubricant of the rotating component and supplies both the other of the first and second lubricant tanks and the lubricant consumer with lubricant via the lubricant channel, and wherein the second lubricant channel extends from the bottom of the second lubricant tank such that the lubricant consumer is supplied with lubricant from the second lubricant tank while the lubricant consumer system is positioned in an inclined position;
wherein the first lubricant channel segment and the second lubricant channel segment each extend away from the bottom of the second lubricant tank in the longitudinal direction in parallel relationship with one another;
wherein a web separates the first lubricant channel segment from the second lubricant channel segment;
wherein the web extends in the longitudinal direction along a longitudinal length of the first and second lubricant channel segments.

2. The lubricant consumer system as claimed in claim 1, wherein the second lubricant tank is configured to be substantially closed and has at least one ventilation opening.

3. The lubricant consumer system as claimed in claim 1, wherein the top of the first lubricant tank receives the fluid lubricant of the rotating component.

4. The lubricant consumer system as set forth in claim 1, wherein the top of at least one of the first and second lubricant tanks is located higher than the consumer in the longitudinal direction.

5. The lubricant consumer system as set forth in claim 1, wherein the tops of both the first and second lubricant tanks are located higher than the consumer in the longitudinal direction.

6. The lubricant consumer system as set forth in claim 5, wherein the top of the second lubricant tank is substantially closed and defines at least one ventilation opening.

7. A lubricant consumer system, comprising:
a first lubricant tank extending between a top and a bottom in a longitudinal direction;
a second lubricant tank extending between a top and a bottom in the longitudinal direction;
a rotating component configured to pass a lubricant into one of the first and second lubricant tanks;
a consumer;
a first lubricant channel segment fluidly connecting the first lubricant tank and the second lubricant tank;
a second lubricant channel segment fluidly connecting the second lubricant tank and the consumer; and
the second lubricant channel segment extending from the bottom of the second lubricant tank such that the lubricant consumer is supplied with lubricant from the second lubricant tank while the lubricant consumer system is positioned in an inclined position;
wherein the first lubricant channel segment and the second lubricant channel segment each extend away from the bottom of the second lubricant tank in the longitudinal direction in parallel relationship with one another;
wherein a web separates the first lubricant channel segment from the second lubricant channel segment;
wherein the web extends in the longitudinal direction along a longitudinal length of the first and second lubricant channel segments.

* * * * *